United States Patent [19]

Tettman et al.

[11] Patent Number: 5,679,244
[45] Date of Patent: Oct. 21, 1997

[54] SPIN-ON LIQUID FILTER WITH UNIQUE STRAIGHT THROUGH FLOW PATH

[75] Inventors: Barton J. Tettman, Tavistock; Robert J. Scotchmer, Stratford, both of Canada

[73] Assignee: AlliedSignal Inc., Morristown, N.J.

[21] Appl. No.: 738,518

[22] Filed: Oct. 28, 1996

[51] Int. Cl.$^6$ .................................................. B01D 35/027
[52] U.S. Cl. ........................ 210/130; 210/247; 210/448; 210/450; 210/DIG. 17
[58] Field of Search ................................ 210/130, 172, 210/430, 448, 449, 247, 320, 446, 450, DIG. 17, 461, 462

[56] References Cited

U.S. PATENT DOCUMENTS

| | | | |
|---|---|---|---|
| 3,334,747 | 8/1967 | Niccum et al. | 210/130 |
| 4,212,739 | 7/1980 | Hilton et al. | 210/130 |

*Primary Examiner*—Matthew O. Savage
*Attorney, Agent, or Firm*—Howard G. Massung

[57] ABSTRACT

A unique cylindrical filter assembly (10) having a flow path in one end (31) through a filter media (18) and out the other end with the inlet (12) and the outlet (14) disposed on the longitudinal center line of the cylindrical filter assembly (10) and with the filter media (18) having an elongated annular shape and being disposed around a center chamber (34). Filter assembly (10) includes a pressure relief valve (22) positioned in the center chamber (34) near the inlet port (12) so when the pressure relief valve (22) opens liquid flows directly into the center chamber (34). A housing member (40) can be provided which covers the outlet end (14) and includes louvers (42) for dispersing the liquid as it exits the filter (10).

6 Claims, 3 Drawing Sheets

SPIN-ON LIQUID FILTER WITH UNIQUE STRAIGHT THROUGH FLOW PATH

BACKGROUND OF THE INVENTION

1. Field of the Invention

This invention relates to liquid filters and more particularly to a spin-on liquid filter having a unique flow through path.

2. Description of Prior Art

Spin-on filters for lubricating oil in internal combustion engines are well known in the art. In these prior art filter assemblies, as illustrated in U.S. Pat. No. 5,112,476, the liquid to be filtered enters through a plurality of circumferentially spaced apart inlet ports or openings formed on one end of the cylindrical shaped filter assembly. The flow path is then toward the outer wall of the filter assembly and then inward through a filter media and into an elongated chamber, in the center of the filter assembly, around which the filter media is disposed. The filtered oil is conducted from the center chamber through a centered outlet port which is formed in the same end as the plurality of inlet ports. The plurality of circumferentially spaced apart inlet ports surround the center outlet port. Various gaskets and seals prevent oil entering the inlet ports from leaking from the installed spin-on filter or from leaking between the outlet port and the inlet ports. A pressure relief valve is installed in the filter assembly on the end of the center chamber opposite the outlet port. If the filter media becomes clogged and can not handle the oil flow, the pressure increases and flow is permitted from the inlet ports through the pressure relief valve and the center chamber to the outlet port without going through the filter media.

SUMMARY OF THE INVENTION

In a spin-on cylindrical liquid filter according the present invention the liquid inlet is through a single port located in the center of one end of the cylindrical shaped filter assembly. The flow path is then outward towards the outer wall of the filter assembly and then inward through an elongated annular shaped filter media, which is disposed around an elongated chamber in the center of filter assembly, and into the center chamber. The filtered fluid is then conducted from the center chamber through an outlet which is formed in the end opposite the inlet port. The filter media, which can be pleated filter paper, a fiber mesh material or the like, is positioned around the elongated center chamber. The inlet port and the outlet are positioned along and disposed around the longitudinal center axis of the filter assembly. A pressure relief valve is disposed in the filter assembly in the end of the center chamber near the inlet port so if the relief valve opens due to increased pressure the flow path is direct to the center chamber and not past the outer side of the filter media. In one embodiment, the outer housing of the filter covers the outlet end and the cylindrical side of the filter assembly. A plurality of circumferentially spaced louvers are formed in the outlet end of the outer housing to disperse the liquid flow as it exits the outlet from the center chamber.

BRIEF DESCRIPTION OF DRAWINGS

For a better understanding of the invention reference may be had to the preferred embodiments exemplary of the invention shown in the accompanying drawings in which.

DETAILED DESCRIPTION OF THE PREFERRED EMBODIMENTS

Figure 1:
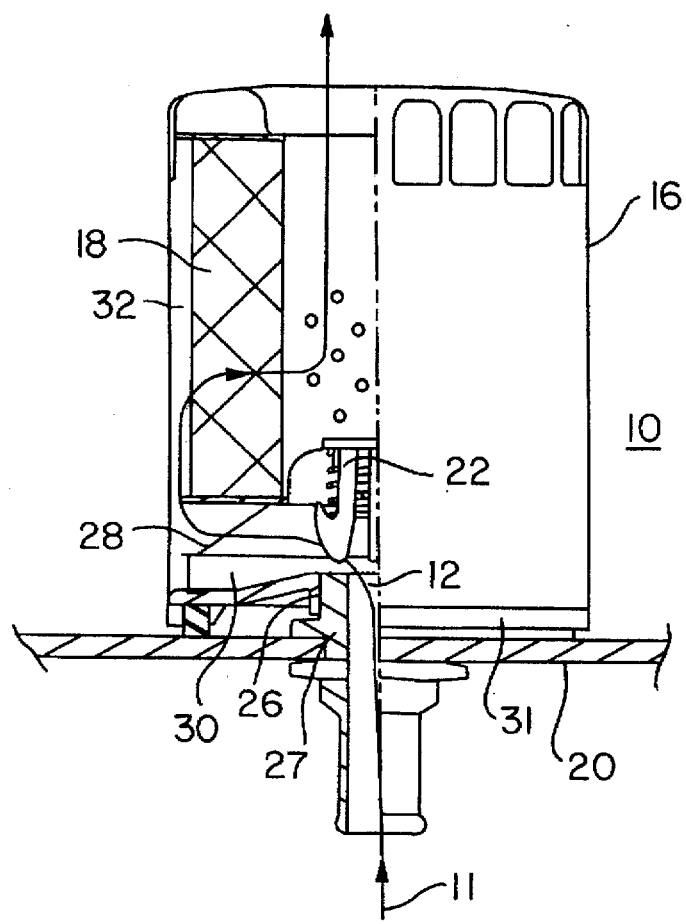
FIG. 1 is a side view, partially in section, illustrating the flow path through a liquid filter constructed according to the present invention.
Figure 2:
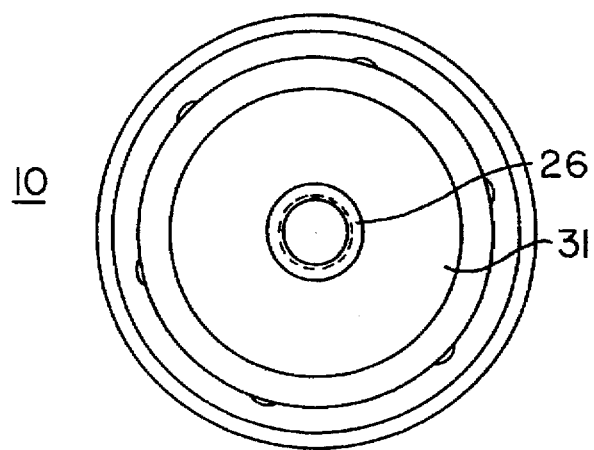
FIG. 2 is a view of the inlet end of the filter assembly shown in FIG. 1.
Figure 3:
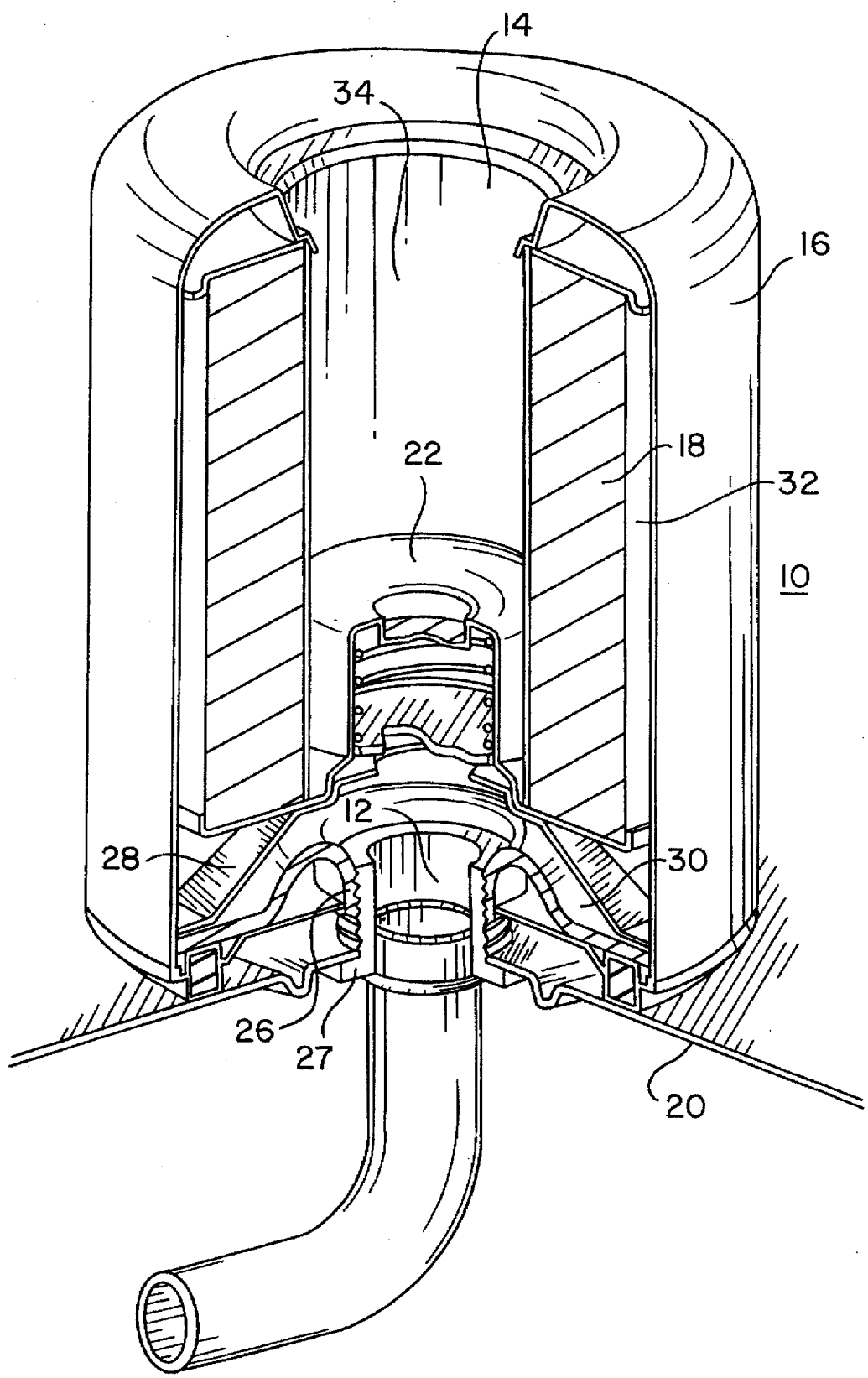
FIG. 3 is a sectional perspective view of a filter similar to the filter shown in FIG. 1.

Referring now to the drawings and FIGS. 1, 2 and 3 in particular there is shown an improved spin-on liquid filter assembly 10 according to the present invention. Filter 10 is adapted to be mounted to a surface 20 or wall of a liquid reservoir. The filter assembly includes an inlet port 12, an outlet 14, and an outer housing 16, which encloses a filter media 18. The filter media, which has an annular elongated shape, can be formed from pleated filter paper, a fiber mesh or other filter materials as known in the art. The elongated annular shaped filter media 18 defines an inner center chamber 34 into which the liquid flows after passing through the filter media 18. The flow path for liquid through filter 10 is generally indicated by line 11 in FIG. 1. A pressure relief valve 22 is disposed in the center chamber 34 of filter 10 near inlet port 12. A retainer 28 supports the filter media 18 and the pressure relief valve 22 from the inlet end 31 of filter 10. The inlet port 12 of filter 10 includes a female threaded portion 26 which screws onto a male threaded collar 27 attached to surface 20.

In operation, the liquid to be filtered enters the inlet port 12 into a lower chamber 30 formed on the inside of the inlet end of filter 10. The liquid then passes through open areas in the retainer 28 into an annular side chamber 32 defined between the inside of outer housing 16 and the filter media 18. From side chamber 32 the liquid is filtered by passing through the filter media 18 into a center chamber 34 and out the outlet 14 into a liquid reservoir. In the event of increased pressure in lower chamber 30 above a set level, the pressure relief valve 22 will open permitting the liquid in lower chamber 30 to flow directly into the center chamber 34 without passing through the filter media 18.

Figure 4:
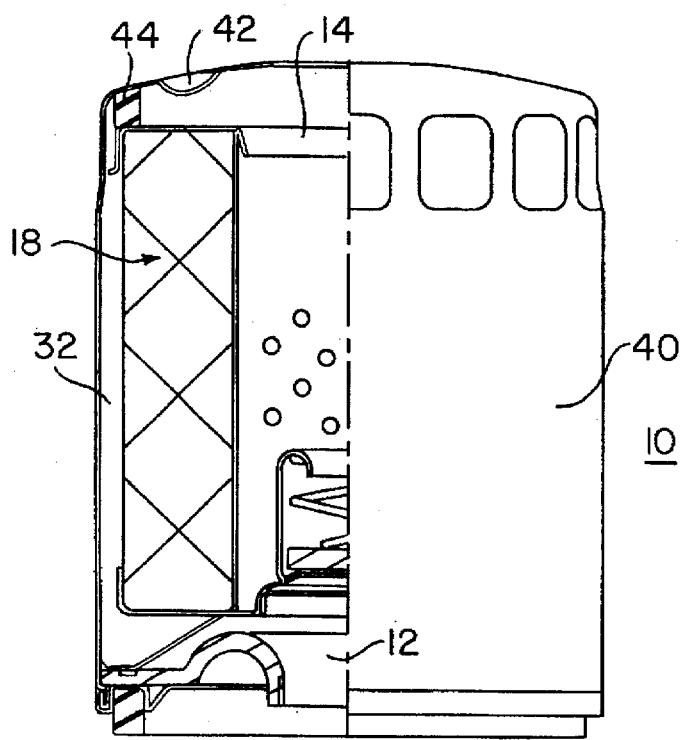
FIG. 4 is a view partially in section showing another embodiment of a liquid filter according to the present invention.
Figure 6:
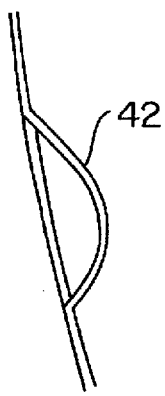
FIG. 6 is an enlarged section view of a portion of the outlet end taken in FIG. 5 along the line VI—VI.
Figure 5:
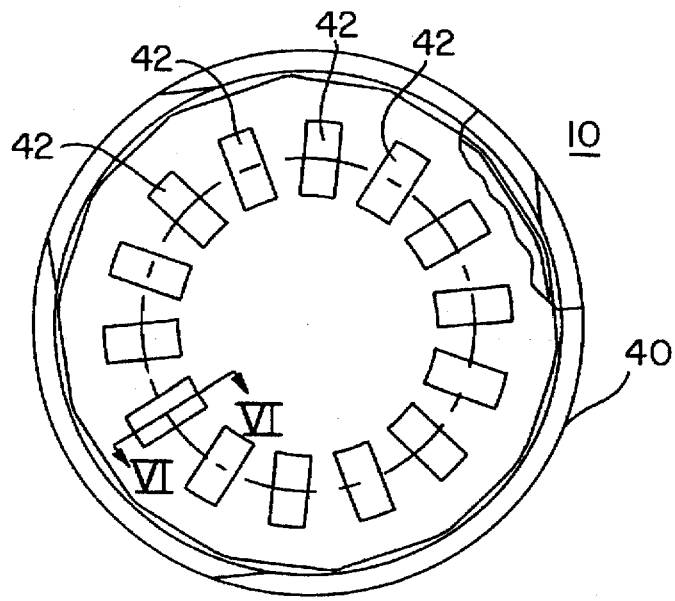
FIG. 5 is a view of the outlet end of the filter assembly shown in FIG. 4.

Referring now to FIGS. 4, 5 and 6 there is shown another embodiment of the present invention. In this embodiment the inside parts of filter assembly 10 are generally the same as in the embodiment shown in FIGS. 1–3 and described above. In the embodiment shown in FIGS. 4–6, filter 10 includes an outer housing 40 formed of one piece and surrounding the circular outside and discharge end outlet 14. The discharge end of housing 40 includes a plurality of circumferentially spaced apart louvers 42 which disperse the liquid flow from outlet 14. A ring shaped seal 44 separates side chamber 32 from the discharge end of housing member 40. The rubber ring seal 44 prevents liquid from traveling to the louvered end of the housing 40 without passing through the filter media 18.

In the filter assembly 10 liquid entering lower chamber 30 passes through the filter media 18 from the outside to the inside and thus a substantial amount of contaminants are collected on the filter media 18 outside surface. In prior art filters during an over pressure situation when the relief valve opens the flow path is over the outside of the filter and some of the contaminants on the outer surface may be picked up.

In the disclosed filter 10, where the pressure relief valve 22 is placed proximate to the inlet port 12, during an over pressure situation the flow path through pressure relief valve 22 will be direct to the center chamber 34 and not over the outer surface of filter media 18. In the filter 10 of this invention, by-capturing many of the contaminants on the outer surface of the filter media 18 they are not exposed to flushing as high pressure liquid, through the relief valve 22, passes along the inner surface of the filter media 18.

The method of cleaning a liquid, such as power steering fluid as it circulates through a reservoir and back to a power steering mechanism using the filter 10 of this invention includes the steps of (1) receiving the fluid through the inlet port 12 into a lower chamber 30, (2) directing the fluid to the side chamber 32, and then (3) directing the fluid through the filter media 18 from its outer surface to its inner surface, where it enters the center chamber, so that larger contaminants in the fluid are collected on the outer surface of the filter media, and then (4) directing the fluid from the center chamber 34 and through outlet 14 and/or louvers 42 into the reservoir.

What is claimed is:

1. A cylindrical filter assembly, having two ends and a longitudinal axis, for filtering a liquid comprising:

an inlet disposed on one end of the filter assembly, an outlet disposed on the end of the filter assembly opposite said inlet and being aligned with said inlet on the longitudinal axis of the cylindrical filter assembly;

a center chamber formed inside of the filter assembly between said inlet and said outlet;

an elongated filter media having an outer side and being disposed around said center chamber;

housing means surrounding the outer side of said filter media to define with respect to said elongated filter media a side chamber;

a pressure relief valve preventing flow into the center chamber from the end near said inlet and directing the liquid flow path to said side chamber, through said elongated filter media and out said outlet; and, said housing means surrounds said outlet and includes louvers to disperse the filtered liquid as it flows from said outlet.

2. A cylindrical filter assembly as claimed in claim 1 wherein:

said housing means includes a seal to prevent liquid flowing around said elongated filter media to said outlet; and, the louvers formed in said housing means are spaced apart and disposed circumferentially around the longitudinal axis of said cylindrical filter assembly.

3. A cylindrical filter assembly as claimed in claim 2 wherein said inlet includes a threaded female portion for attaching to an item having a matching male threaded portion.

4. A cylindrical filter assembly as claimed in claim 1 wherein said pressure relief valve is disposed in said center chamber proximate said inlet and which when open permits liquid flow from said inlet direct to said center chamber.

5. A liquid filter comprising:

a base plate having a generally round shape and including a centered inlet for admitting liquid into the filter;

a cylindrical shaped housing having a closed end, with louvers formed therein, and an open end which engages said base plate;

an elongated annular shaped filter media disposed within said cylindrical shaped housing and defining a side chamber with respect to said cylindrical shaped housing and surrounding an elongated center chamber which has a first end near said inlet and a second end extending to an outlet;

a pressure relief valve disposed in the end of said elongated center chamber proximate said inlet and which when closed directs liquid flow from said inlet to said side chamber; and, sealing means disposed in the closed end of said cylindrical shaped housing to prevent liquid flow from said side chamber to the closed end of said cylindrical shaped housing without passing through said filter media and directing the liquid flow path through said filter media into said center chamber and out of said outlet and through the louvers to exit the filter.

6. A filter as claimed in claim 5 wherein said inlet includes a threaded female portion for attaching to an item having a matching male threaded collar.

* * * * *